No. 810,487. PATENTED JAN. 23, 1906.
I. O. HOTALING.
WHEEL FOR TRACTION ENGINES.
APPLICATION FILED JUNE 12, 1905.

Witnesses
Robt. A. Boswell
Clara S. Davenport

Inventor
Irvin O. Hotaling
By Franklin N. Hough
Attorney

UNITED STATES PATENT OFFICE.

IRVIN O. HOTALING, OF CRAB ORCHARD, NEBRASKA.

WHEEL FOR TRACTION-ENGINES.

No. 810,487.  Specification of Letters Patent.  Patented Jan. 23, 1906.

Application filed June 12, 1905. Serial No. 264,973.

*To all whom it may concern:*

Be it known that I, IRVIN O. HOTALING, a citizen of the United States, residing at Crab Orchard, in the county of Johnson and State of Nebraska, have invented certain new and useful Improvements in Wheels for Traction-Engines; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a wheel for traction-engines, and particularly to an improvement upon my prior patent, No. 789,913.

The invention has for an object to provide means for positively holding spurs in projected position and for automatically retracting the same when released from said holding means.

A further object of the invention is to provide improvement in the details of construction and arrangement of parts, which will be hereinafter more fully described and then specifically defined in the appended claims.

Figure 1:
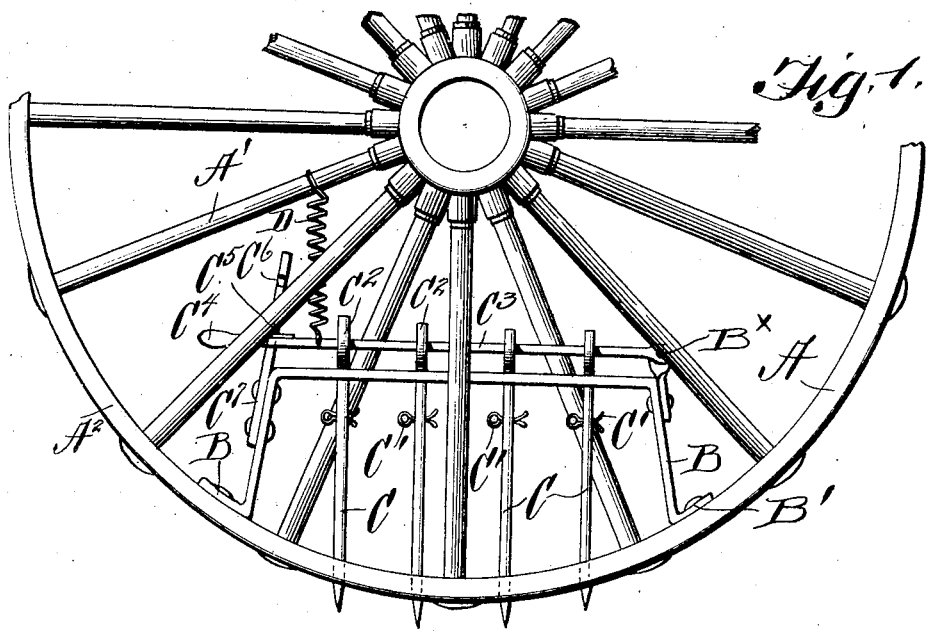
Figure 2:
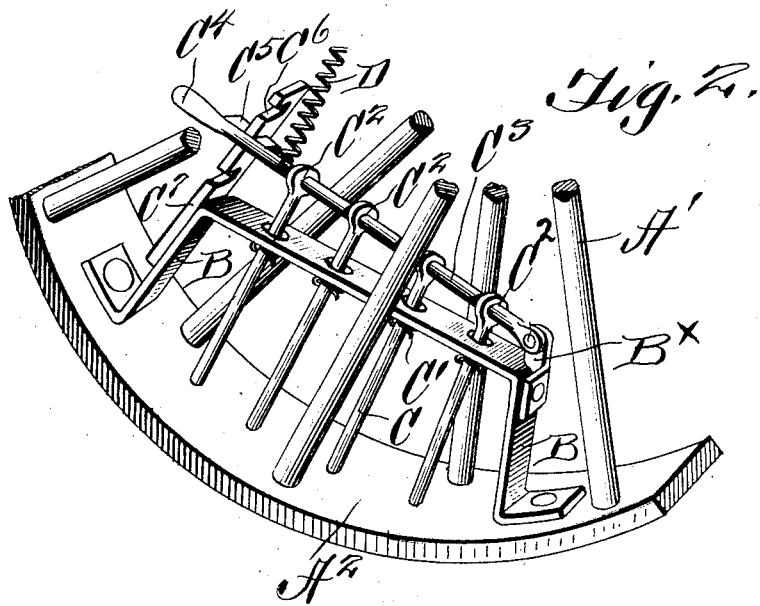

In the drawings, Figure 1 is a side elevation of a portion of a wheel, showing the invention applied thereto; and Fig. 2 is a detail perspective illustrating the application of the invention.

Like letters of reference refer to like parts in the several figures of the drawings.

The letter A designates a wheel of any desired construction such as ordinarily used upon traction-engines or similar vehicles. This wheel is provided with a series of spokes A' and with the usual rim A², upon which the supporting-bracket B for the spurs C is mounted at its opposite ends by means of bolts or other fastenings B'. This bracket is provided upon its upper face with a series of apertures of greater diameter than the spurs to permit their free passage therethrough, while each of the spurs is provided with a stop projection C' to limit the upward travel thereof. The spurs are also formed at their ends beyond the bracket B with eyes C², through which the operating-rod C³ is passed, said rod being pivoted at its end to a suitable lug B×, carried at one end of the bracket B. The opposite end of the bar is formed with a handle C⁴ and with a tooth C⁵, adapted to engage in the notches or recesses C⁶ of a ratchet-plate C⁷, applied to the end of the bracket B.

The spurs are normally withdrawn within the periphery of the rim by means of a tension-spring D, which extends from the lever C⁴ to one of the spokes of the wheel, as shown in Fig. 1.

In the operation of the invention the spurs are projected by pressure upon the handle of the operating-lever, which is then engaged with a rack-bar to hold the spurs at any desired degree of projection and retain the spring under tension. As soon as the bar is released the spring immediately retracts the spurs, which being all carried by the bar are simultaneously moved.

This construction provides means by which the parts may be quickly and simply operated whenever found necessary for convenience and one which is not liable to be injured in the operation of the vehicle or to be clogged by the accumulation of dirt or dust thereon in the ordinary traffic conditions to which the vehicle or engine is submitted.

Having thus fully described my invention and set forth its merits, what I claim as new, and desire to secure by Letters Patent, is—

1. An attachment for wheels, comprising a bracket-plate adapted to be applied to the rim thereof, a series of spurs extending through said plate, and an operating-lever connected to each of said spurs and pivotally mounted upon said bracket.

2. An attachment for wheels, comprising a bracket-plate adapted to be applied to the rim thereof, a series of spurs extending through said plate, an operating-lever connected to each of said spurs and pivotally mounted upon said bracket, and a ratchet-bar carried at the opposite end of the bracket from the pivot of said lever.

3. An attachment for wheels, comprising a bracket-plate adapted to be applied to the rim thereof, a series of spurs extending through said plate, an operating-lever connected to each of said spurs and pivotally mounted upon said bracket, a ratchet-bar carried at the opposite end of the bracket from the pivot of said lever, and a retracting-spring extending from said lever to a relatively fixed portion of the wheel.

4. An attachment for wheels, comprising an apertured supporting-bracket, a series of spurs extending therethrough and through the wheel, eyes at the inner ends of said spurs, an operating-lever extending through said eyes, a pivotal lug carried by the bracket at one end of said operating-lever, a ratchet-tooth carried by said lever; and a coöperating ratchet-plate at the opposite end of said bracket.

5. An attachment for wheels, comprising an apertured supporting-bracket, a series of spurs extending therethrough and through the wheel, eyes at the inner ends of said spurs, an operating-lever extending through said eyes, a pivotal lug carried by the bracket at one end of said operating-lever, a ratchet-tooth carried by said lever, a coöperating ratchet-plate at the opposite end of said bracket, a stop projection carried by said spurs to engage the under face of said bracket, and a retracting-spring extending from said lever to a spoke of the wheel.

In testimony whereof I hereunto affix my signature in the presence of two witnesses.

IRVIN O. HOTALING.

Witnesses:
H. C. PLATT,
I. S. PLATT.